US009882613B2

(12) United States Patent
Daniel

(10) Patent No.: US 9,882,613 B2
(45) Date of Patent: Jan. 30, 2018

(54) DETERMINING ACTUAL LOOP GAIN IN A DISTRIBUTED ANTENNA SYSTEM (DAS)

(71) Applicant: Corning Optical Communications Wireless Ltd, Airport City (IL)

(72) Inventor: Liay Moshe Daniel, Gedera (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 66 days.

(21) Appl. No.: 15/157,970

(22) Filed: May 18, 2016

(65) Prior Publication Data
US 2016/0352612 A1 Dec. 1, 2016

Related U.S. Application Data

(60) Provisional application No. 62/169,267, filed on Jun. 1, 2015.

(51) Int. Cl.
*H04B 1/04* (2006.01)
*H04B 17/00* (2015.01)
*H04L 12/26* (2006.01)
*H04B 7/0413* (2017.01)
*H04L 5/14* (2006.01)
*H04W 88/08* (2009.01)

(52) U.S. Cl.
CPC ........... *H04B 7/0413* (2013.01); *H04L 5/14* (2013.01); *H04L 43/10* (2013.01); *H04W 88/085* (2013.01)

(58) Field of Classification Search
CPC ......... H04B 7/0413; H04L 5/14; H04L 43/10; H04L 43/50; H04W 72/042; H04W 72/0413; H04W 88/085

USPC .... 455/127.2–127.4, 136–139, 232.1–251.1; 370/249, 252
See application file for complete search history.

(56) References Cited

U.S. PATENT DOCUMENTS

| 4,515,472 | A | * | 5/1985 | Welch | G01S 7/4812 250/203.5 |
| 5,430,717 | A | * | 7/1995 | Fowler | H04Q 11/04 370/254 |
| 6,025,941 | A | * | 2/2000 | Srivastava | H04J 14/0221 370/222 |
| 6,061,170 | A | * | 5/2000 | Rice | H01S 3/06716 359/345 |
| 6,751,014 | B2 | * | 6/2004 | DeCusatis | H01S 3/06754 359/341.41 |
| 6,765,931 | B1 | * | 7/2004 | Rabenko | H04B 3/23 348/E7.049 |

(Continued)

*Primary Examiner* — Thai Hoang
(74) *Attorney, Agent, or Firm* — C. Keith Montgomery

(57) ABSTRACT

Embodiments of the disclosure relate to determining actual loop gain in a distributed antenna system (DAS). In this regard, a test signal(s) having a first power level is injected into a DAS from a first contact point. The test signal(s) is configured to propagate from the first contact point to a second contact point over a downlink path and an uplink path, thus creating a signal loop(s). A second power level of the test signal(s) is measured at the second contact point, and an actual loop gain of the DAS is determined by subtracting the first power level from the second power level. By determining the actual loop gain of the DAS, it is possible to further determine a gain margin of the DAS. Based on the gain margin, it is possible to determine optimization possibilities for the DAS to maximize capacity and performance of the DAS.

29 Claims, 10 Drawing Sheets

(56) References Cited

U.S. PATENT DOCUMENTS

| | | | | |
|---|---|---|---|---|
| 6,922,388 | B1* | 7/2005 | Laroia | H04J 3/0682 |
| | | | | 370/208 |
| 8,254,404 | B2* | 8/2012 | Rabenko | H04B 3/23 |
| | | | | 370/230.1 |
| 8,699,972 | B2* | 4/2014 | Lee | H04W 52/04 |
| | | | | 455/114.3 |
| 2002/0167721 | A1* | 11/2002 | Caplan | H01S 3/06754 |
| | | | | 359/341.3 |
| 2005/0089027 | A1* | 4/2005 | Colton | H04Q 11/0005 |
| | | | | 370/380 |
| 2007/0071112 | A1* | 3/2007 | Gattani | H04L 25/0272 |
| | | | | 375/257 |
| 2009/0298440 | A1* | 12/2009 | Takeya | H01Q 1/243 |
| | | | | 455/67.14 |
| 2011/0143658 | A1 | 6/2011 | Hanson et al. | |
| 2014/0144230 | A1* | 5/2014 | Magnoni | G01C 19/5726 |
| | | | | 73/504.12 |
| 2014/0273891 | A1* | 9/2014 | Costa | H04B 1/18 |
| | | | | 455/90.2 |
| 2015/0180415 | A1* | 6/2015 | Fernandes Barros | H03D 3/009 |
| | | | | 375/219 |

\* cited by examiner

DETERMINING ACTUAL LOOP GAIN IN A DISTRIBUTED ANTENNA SYSTEM (DAS)

CROSS-REFERENCE TO RELATED APPLICATIONS

This application claims the benefit of priority under 35 U.S.C. §119 of U.S. Provisional Application Ser. No. 62/169,267 filed on Jun. 1, 2015, the content of which is relied upon and incorporated herein by reference in its entirety.

BACKGROUND

The disclosure relates generally to distributed antenna systems (DAS), and more particularly to techniques for measuring gain within the DAS.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of DASs. A DAS is a wireless communications distribution system. A DAS includes a plurality of remote antenna units (RAUs) each configured to receive and transmit communications signals to client devices within the antenna range of the RAUs. A DAS can be particularly useful when deployed inside buildings or other indoor environments where the wireless communication devices may not otherwise be able to effectively receive radio frequency (RF) signals from a source.

In this regard, FIG. 1 illustrates distribution of communications services to remote coverage areas 100(1)-100(N) of a DAS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on RAUs 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the RAUs 104(1)-104(N). The RAUs 104(1)-104(N) are configured to receive the downlink communications signals 110D from the HEE 106 over a communications medium 112 to be distributed to the respective remote coverage areas 100(1)-100(N) of the RAUs 104(1)-104(N). In a non-limiting example, the communications medium 112 may be a wired communications medium, a wireless communications medium, or an optical fiber-based communications medium. Each of the RAUs 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The RAUs 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by amount of RF power transmitted by the respective RAUs 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the RAUs 104(1)-104(N) mainly determine the size of the respective remote coverage areas 100(1)-100(N).

With continuing reference to FIG. 1, when the DAS 102 is configured to operate based on frequency division duplexing (FDD), the downlink communications signals 110D and the uplink communications signals 110U are communicated between the HEE 106 and the RAUs 104(1)-104(N) over downlink path(s) 118 and uplink path(s) 120, respectively. Since isolation between the downlink path(s) 118 and the uplink path(s) 120 may be limited, energy from the downlink path(s) 118 may leak into the uplink path(s) 120 and subsequently loop back to the downlink path(s) 118, thus causing the downlink communications signals 110D to gain extra energy. This extra energy gain resulted from energy leaked from the downlink path(s) 118 to the uplink path(s) 120 and looped back to the downlink path(s) 118 is hereinafter referred to as a loop gain. The loop gain can distort the downlink communications signals 110D. As a result, under certain gain and phase shift conditions (e.g., conditions according to the Barkhausen stability criterion), the downlink communications signals 110D and the uplink communications signals 110U in the DAS 102 may start oscillating. As a result, the DAS 102 may become unstable.

By designing and configuring the DAS 102 based on the generic loop gain, it is possible to minimize distortions to the downlink communications signals 110D resulting from the energy feedback, thus enabling stable operations of the DAS 102. Generic loop gain is defined in this context as a worst-case loop gain of the DAS 102. In this regard, the generic loop gain is defined based on the assumptions that the number of RAUs 104(1)-104(N) is large, and isolations between the downlink path(s) 118 and the uplink path(s) 120 (and vise versa) are minimal. However, by designing and configuring the DAS 102 based on the worst-case loop gain, it may lead to under-configuration and underutilization of the DAS 102.

No admission is made that any reference cited herein constitutes prior art. Applicant expressly reserves the right to challenge the accuracy and pertinency of any cited documents.

SUMMARY

Embodiments of the disclosure relate to determining actual loop gain in a distributed antenna system (DAS). The DAS receives at least one communications service from at least one signal source (e.g., a base station or baseband unit (BBU), and includes a head end unit (HEU) and a plurality of remote antenna units (RAUs). Actual loop gain is a power differential of a test signal(s) measured at two different contact points in a HEU in a DAS. In this regard, a downlink path in the HEU is disconnected to create a first contact point and a second contact point. The test signal(s) having a first power level is injected from the first contact point. The test signal(s) propagates over the downlink path(s) in the DAS from the first contact point to an RAU(s), and returns from the RAU(s) to the second contact point in the HEU over an uplink path, thus creating a signal loop(s). A second power level of the test signal(s) is measured at the second contact point to determine the actual loop gain of the DAS. The actual loop gain of the DAS is determined by subtracting the first power level from the second power level. By determining the actual loop gain of the DAS, it is possible to further determine a gain margin of the DAS. Based on the gain margin, it is possible to determine optimization possibilities (e.g., determine a margin of gain by comparing the actual loop gain against a predetermined threshold) for the DAS to maximize capacity and performance of the DAS.

One embodiment of the disclosure relates to a DAS configured to enable actual loop gain measurement. The DAS comprises a plurality of RAUs. The DAS also comprises an HEU. The HEU is configured to distribute a downlink signal to at least one RAU among the plurality of RAUs. The HEU is also configured to receive an uplink signal from the at least one RAU. The DAS also comprises a switch circuit disposed in a downlink path in the HEU and configured to disconnect the downlink path into a first contact point and a second contact point. The DAS also comprises a signal generator communicatively coupled to the first contact point. The signal generator is configured to provide at least one test signal having a first power level to the first contact point for distribution to the at least one RAU on the downlink path. The DAS also comprises a receiver communicatively coupled to the second contact point. The receiver is configured to receive at least one loopback test signal having a second power level from the second contact point. The receiver is also configured to determine a difference between the first power level of the at least one test signal at the first contact point and the second power level of the at least one loopback test signal at the second contact point. The receiver is also configured to determine an actual loop gain of the DAS based on the determined difference between the first power level and the second power level.

Another embodiment of the disclosure relates to a method for measuring actual loop gain in a DAS. The method comprises disconnecting a downlink path in an HEU into a first contact point and a second contact point. The method also comprises providing at least one test signal having a first power level from the first contact point to at least one RAU in the DAS on the downlink path. The method also comprises receiving at least one loopback test signal having a second power level from the second contact point. The method also comprises determining a difference between the first power level of the at least one test signal at the first contact point and the second power level of the at least one loopback test signal at the second contact point. The method also comprises determining an actual loop gain of the DAS based on the determined difference between the first power level and the second power level.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to determining actual loop gain in a distributed antenna system (DAS). The DAS receives at least one communications service from at least one signal source (e.g., a base station or baseband unit (BBU), and includes a head end unit (HEU) and a plurality of remote antenna units (RAUs). Actual loop gain is a power differential of a test signal(s) measured at two different contact points in a HEU in a DAS. In this regard, a downlink path in the HEU is disconnected to create a first contact point and a second contact point. The test signal(s) having a first power level is injected from the first contact point. The test signal(s) propagates over the downlink path(s) in the DAS from the first contact point to an RAU(s), and returns from the RAU(s) to the second contact point in the HEU over an uplink path, thus creating a signal loop(s). A second power level of the test signal(s) is measured at the second contact point to determine the actual loop gain of the DAS. The actual loop gain of the DAS is determined by subtracting the first power level from the second power level. By determining the actual loop gain of the DAS, it is possible to further determine a gain margin of the DAS. Based on the gain margin, it is possible to determine optimization possibilities (e.g., determine a margin of gain by comparing the actual loop gain against a predetermined threshold) for the DAS to maximize capacity and performance of the DAS.

Before discussing examples of determining actual loop gain in a DAS starting at FIG. 3, an overview of an exemplary DAS having loop gains associated with downlink and uplink paths is first discussed with reference to FIG. 2. The discussion of specific exemplary aspects of determining actual loop gain of a DAS starts with reference to FIG. 3.

Figure 1:
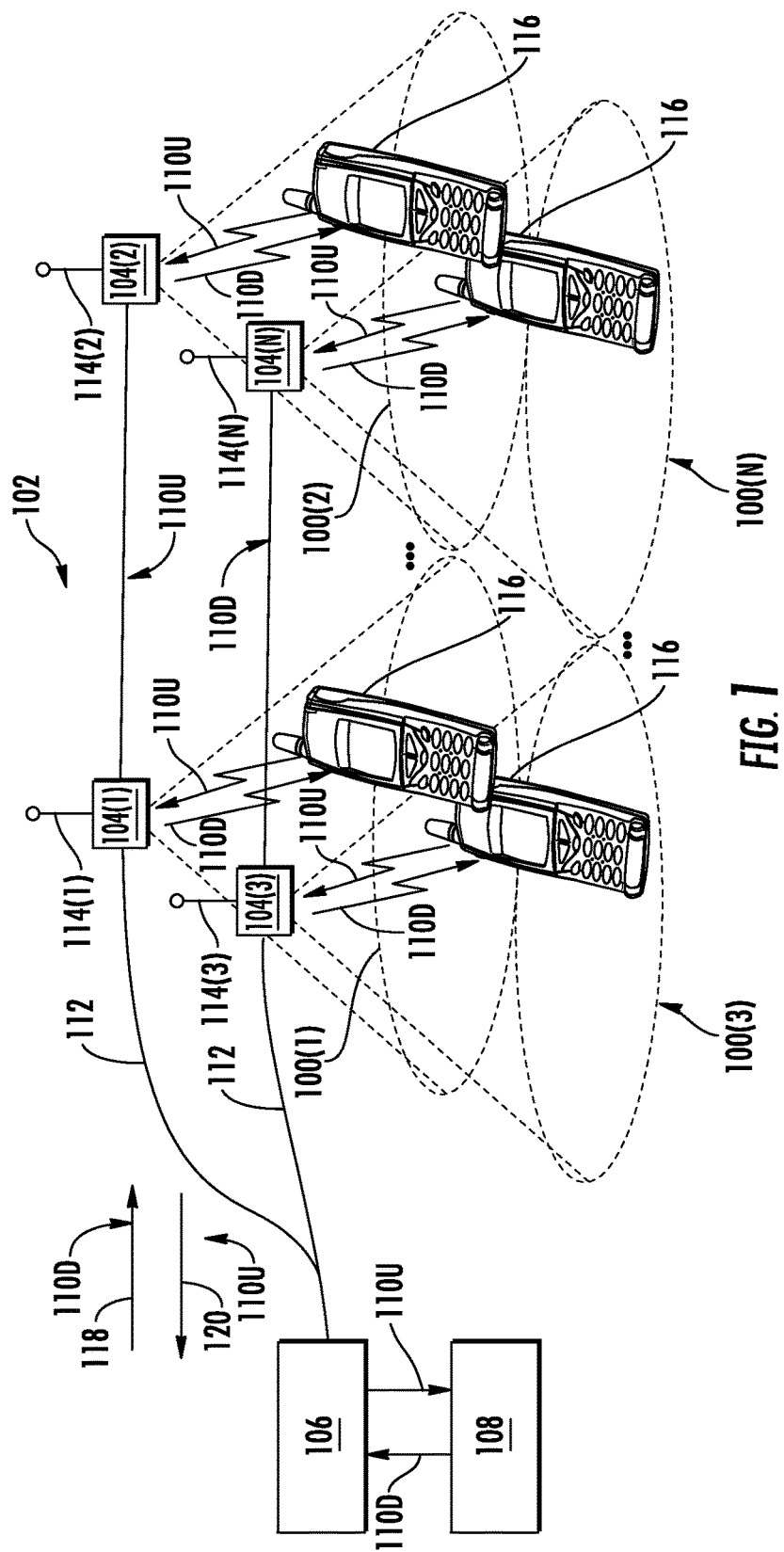
FIG. 1 illustrates distribution of communications services to remote coverage areas of a distributed antenna system (DAS)
Figure 2:
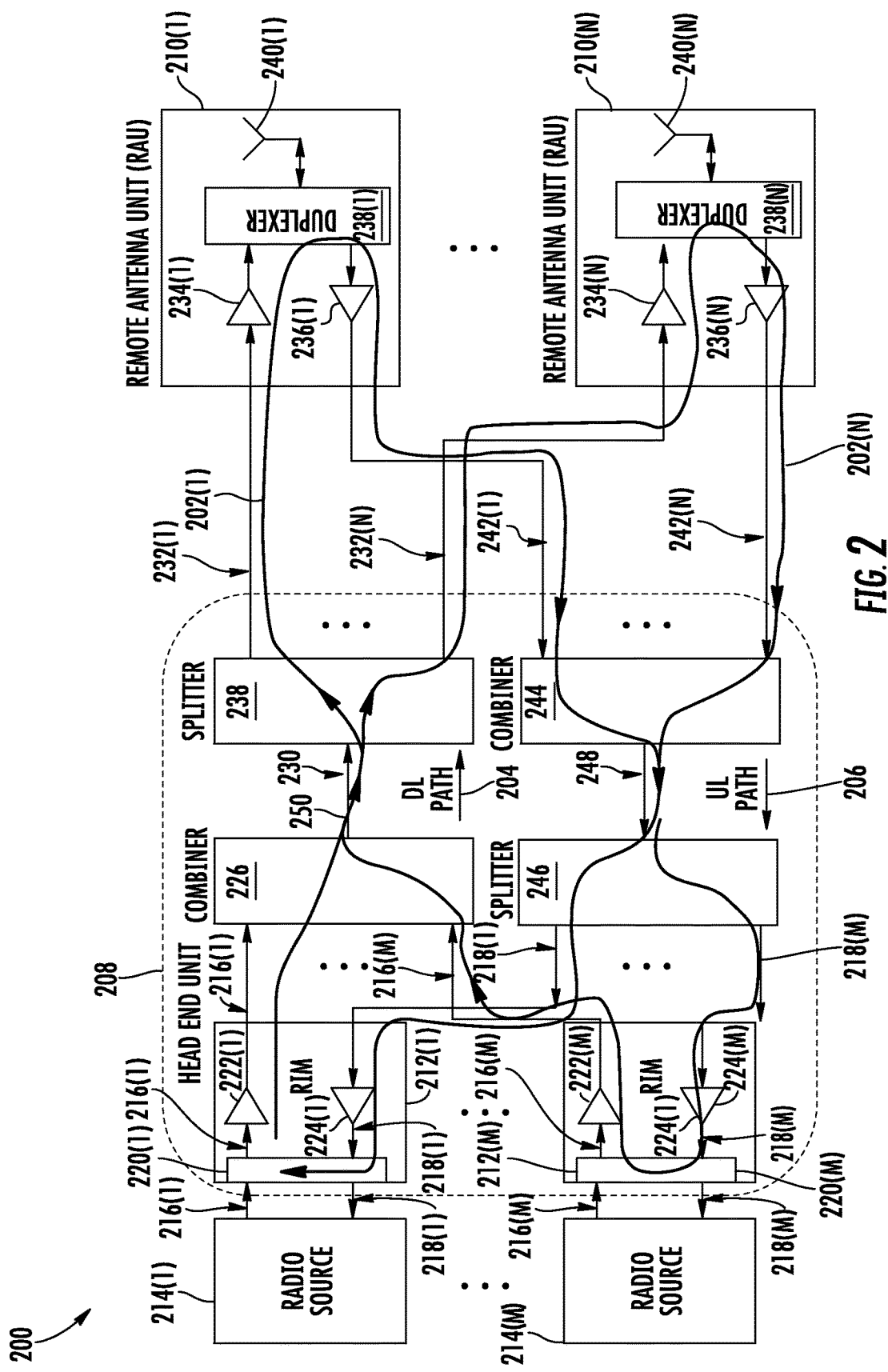
FIG. 2 is a schematic diagram of an exemplary DAS including one or more signal loops indicating potential loop gains generated by various components provided in a downlink path and an uplink path between a head end unit (HEU) and a plurality of remote antenna units (RAUs)

In this regard, FIG. 2 is a schematic diagram of an exemplary DAS 200 including one or more signal loops 202(1)-202(N) indicating potential loop gains generated by various components provided in a downlink path 204 and an uplink path 206 between a head end unit (HEU) 208 and a plurality of RAUs 210(1)-210(N). With reference to FIG. 2, the HEU 208 includes one or more radio interface modules (RIMs) 212(1)-212(M) that are communicatively coupled to one or more radio sources 214(1)-214(M), respectively. In a non-limiting example, each of the radio sources 214(1)-214(M) is configured to provide a respective wireless communication service, such as long-term evolution (LTE) and wideband code division multiple access (WCDMA). The RIMs 212(1)-212(M) are configured to receive one or more downlink communications signals 216(1)-216(M) from the radio sources 214(1)-214(M), respectively. In a non-limiting example, the downlink communications signals 216(1)-216(M) correspond to a plurality of frequency bands (not shown), including LTE frequency bands, personal communications service (PCS) frequency bands, and/or advanced wireless service (AWS) frequency bands. The RIMs 212(1)-212(M) are also configured to provide one or more uplink communications signals 218(1)-218(M) to the radio sources 214(1)-214(M), respectively. The RIMs 212(1)-212(M) include one or more HEU duplexers 220(1)-220(M), one or more RIM downlink circuits 222(1)-222(M), and one or more RIM uplink circuits 224(1)-224(M), respectively. In a non-limiting example, the RIM downlink circuits 222(1)-222(M) are configured to perform frequency filtering and conversion (e.g., frequency downshift or upshift) on the downlink communications signals 216(1)-216(M), respectively, before distributing the downlink communications signals 216(1)-216(M) on the downlink path 204. Likewise, the RIM uplink circuits 224(1)-224(M) are configured to perform frequency filtering and conversion (e.g., frequency downshift or upshift) on the uplink communications signals 218(1)-218(M) received on the uplink path 206 before providing the uplink communications signals 218(1)-218(M) to the radio sources 214(1)-214(M), respectively. In this regard, the HEU duplexers 220(1)-220(M) couple the RIM downlink circuits 222(1)-222(M) to the radio sources 214(1)-214(M) to receive the downlink communications signals 216(1)-216(M), respectively. The HEU duplexers 220(1)-220(M) also couple the RIM uplink circuits 224(1)-224(M) to the radio sources 214(1)-214(M) to provide the uplink communications signals 218(1)-218(M) to the radio sources 214(1)-214(M), respectively.

With continuing reference to FIG. 2, the HEU 208 includes a downlink combiner 226 and a downlink splitter 228. The downlink combiner 226 and the downlink splitter 228 are disposed in the downlink path 204. The downlink combiner 226 is configured to combine the downlink communications signals 216(1)-216(M) to generate a combined downlink communications signal 230. The downlink splitter 228 is configured to receive the combined downlink communications signal 230 from the downlink combiner 226 and generate a plurality of downlink electrical signals 232(1)-232(N) for distribution to the RAUs 210(1)-210(N), respectively. In a non-limiting example, each of the RAUs 210(1)-210(N) is configured to communicate at a predetermined set of frequency channels/bands. As such, the downlink splitter 228 splits the downlink communications signals 216(1)-216(M) into the downlink electrical signals 232(1)-232(N) based on the predetermined set of frequency channels/bands associated with each of the RAUs 210(1)-210(N).

The RAUs 210(1)-210(N) include a plurality of RAU downlink circuits 234(1)-234(N), a plurality of RAU uplink circuits 236(1)-236(N), and a plurality of RAU duplexers 238(1)-238(N), respectively. The RAU duplexers 238(1)-238(N) are communicatively coupled to a plurality of antennas 240(1)-240(N), respectively. In a non-limiting example, the antennas 240(1)-240(N) are multiple-input, multiple-output (MIMO) antennas. The RAU downlink circuits 234(1)-234(N) receive and provide the downlink electrical signals 232(1)-232(N) to the RAU duplexers 238(1)-238(N), respectively. The RAU duplexers 238(1)-238(N) in turn provide the downlink electrical signals 232(1)-232(N) to the antennas 240(1)-240(N), respectively, for distribution to client devices (not shown) in the DAS 200.

With continuing reference to FIG. 2, the RAU duplexers 238(1)-238(N) are configured to receive a plurality of uplink electrical signals 242(1)-242(N) from the antennas 240(1)-240(N) and provide the uplink electrical signals 242(1)-242(N) to the RAU uplink circuits 236(1)-236(N), respectively. In a non-limiting example, the RAU duplexers 238(1)-238(N) do not have sufficient isolations between the downlink electrical signals 232(1)-232(N) and the uplink electrical signals 242(1)-242(N), respectively. As a result, the downlink electrical signals 232(1)-232(N) may leak from the downlink path 204 into the uplink path 206, thus contributing to the loop gains on the signal loops 202(1)-201(N), respectively.

With continuing reference to FIG. 2, the HEU 208 includes an uplink combiner 244 and an uplink splitter 246. The uplink combiner 244 receives the uplink electrical signals 242(1)-242(N) from the RAUs 210(1)-210(N), respectively. The uplink combiner 244 combines the uplink electrical signals 242(1)-242(N) to generate a combined uplink communications signal 248. The uplink splitter 246 splits the combined uplink communications signal 248 to generate the uplink communications signals 218(1)-218(M). The RIM uplink circuits 224(1)-224(M) receive the uplink communications signals 218(1)-218(M) and provide the uplink communications signals 218(1)-218(M) to the HEU duplexers 220(1)-220(M), respectively. The HEU duplexers 220(1)-220(M) provide the uplink communications signals 218(1)-218(M) to the radio sources 214(1)-214(M), respectively. In a non-limiting example, the HEU duplexers 220(1)-220(M) do not have sufficient isolations between the downlink communications signals 216(1)-216(M) and the uplink communications signals 218(1)-218(M), respectively. As a result, the uplink communications signals 218(1)-218(M) may leak from the uplink path 206 into the downlink path 204, thus contributing to the loop gains on the signal loops 202(1)-202(N), respectively.

With continuing reference to FIG. 2, each of the signal loops 202(1)-202(N) produces a respective loop gain. As such, the actual loop gain ($G_{LA}$) of the DAS 200 is a sum of the respective loop gains produced by the signal loops 202(1)-202(N). The loop gains from the signal loops 202(1)-202(N) can distort the downlink communications signals 216(1)-216(M). As a result, under certain gain and phase shift conditions (e.g., conditions according to the Barkhausen stability criterion), the downlink communications signals 216(1)-216(M) and the uplink communications signals 218(1)-218(M) in the DAS 200 may start oscillating. As a result, the DAS 200 may become unstable.

As can be seen in FIG. 2, the signal loops 202(1)-202(N) converge at a physical link 250, which is a coaxial cable for example, connecting the downlink combiner 226 and the downlink splitter 228. As such, it is possible to measure the actual loop gain of the DAS 200 at the physical link 250 by breaking up the physical link 250 to create two contact points and measure a power differential of a test signal injected from one contact point and propagated to another contact point. In this regard, FIG. 3 is a schematic diagram of an exemplary DAS 300 configured to enable measurement of an actual loop gain ($G_{LA}$) based on at least one test signal 302.

Figure 3:
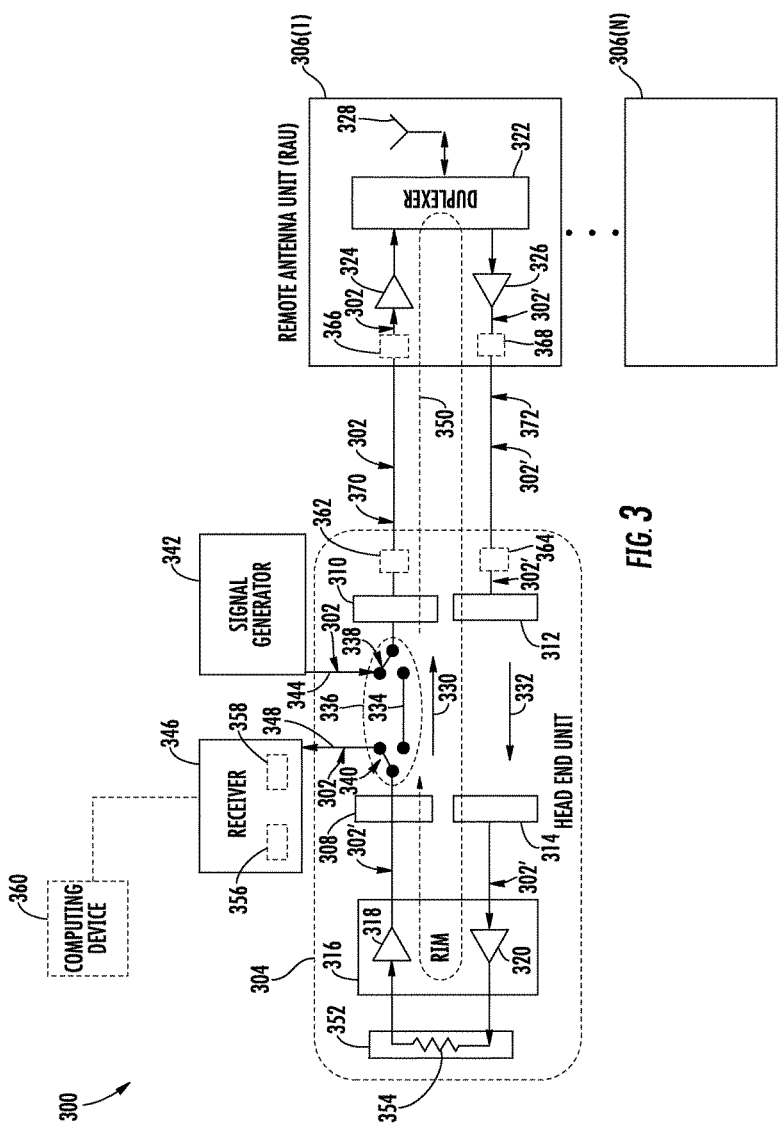
FIG. 3 is a schematic diagram of an exemplary DAS configured to enable measurement of an actual loop gain ($G_{LA}$) of the DAS based on determining the difference in power level of at least one test signal injected into the DAS at a first contact point in the DAS and received at a second contact point in the DAS.

With reference to FIG. 3, the DAS 300 includes an HEU 304 and a plurality of RAUs 306(1)-306(N). The RAU 306(1) is discussed hereinafter as a non-limiting example. The HEU 304 includes a downlink combiner 308, a downlink splitter 310, an uplink combiner 312, and an uplink splitter 314. The HEU 304 includes at least one RIM 316 that includes an RIM downlink circuit 318 and an RIM uplink circuit 320. In a non-limiting example, the downlink combiner 308 is functionally equivalent to the downlink combiner 226 of FIG. 2. The downlink splitter 310 is functionally equivalent to the downlink splitter 228 of FIG. 2. The uplink combiner 312 is functionally equivalent to the uplink combiner 244 of FIG. 2. The uplink splitter 314 is functionally equivalent to the uplink splitter 246 of FIG. 2. The RIM 316 is functionally equivalent to any of the RIMs 212(1)-212(M) of FIG. 2. The RIM downlink circuit 318 is functionally equivalent to any of the RIM downlink circuits 222(1)-222(M) of FIG. 2. The RIM uplink circuit 320 is functionally equivalent to any of the RIM uplink circuits 224(1)-224(M) of FIG. 2. The RAU 306(1) includes an RAU duplexer 322, an RAU downlink circuit 324, an RAU uplink circuit 326, and an antenna 328. In a non-limiting example, the antenna 328 is a MIMO antenna. The RAU duplexer 322 is functionally equivalent to any of the RAU duplexers 238(1)-238(N) of FIG. 2. The RAU downlink circuit 324 is functionally equivalent to any of the RAU downlink circuits 234(1)-234(N) of FIG. 2. The RAU uplink circuit 326 is functionally equivalent to any of the RAU uplink circuits 236(1)-236(N) of FIG. 2. The antenna 328 is functionally equivalent to any of the antennas 240(1)-240(N) of FIG. 2.

The DAS 300 includes a downlink path 330 and an uplink path 332. The downlink combiner 308 and the downlink splitter 310 are connected by a link 334, which is a coaxial cable, for example. A switch circuit 336, which is a broadband switch circuit having broadband isolation in a non-limiting example, is disposed in the downlink path 330. The switch circuit 336 is configured to disconnect (i.e., break) the downlink path 330 into a first contact point 338 and a second contact point 340. As such, the test signal 302 is injected at the first contact point 338 and propagates to the second contact point 340 as a loopback test signal 302'. Accordingly, a power differential of the test signal 302 at the first contact point 338 and the loopback test signal 302' at the second contact point 340 can be measured to determine the actual loop gain ($G_{LA}$). In a non-limiting example, the switch circuit 336 is provided on a portion of the downlink path 330 that is between the downlink combiner 308 and the downlink splitter 310. This is because the portion of the downlink path 330 between the downlink combiner 308 and the downlink splitter 310 is the downlink pathway of all downlink communications signals (e.g., the downlink communications signals 216(1)-216(M) of FIG. 2) communicating from the HEU 304 to the RAUs 306(1)-306(N). Therefore, by providing the switch circuit 336 at the portion of the downlink path 330 between the downlink combiner 308 and the downlink splitter 310, it is possible to measure the actual loop gain ($G_{LA}$) with the test signal 302 in a condition closer to actual operating conditions of the DAS 300. In this regard, the switch circuit 336 decouples the downlink combiner 308 and the downlink splitter 310 from the link 334 to allow only the test signal 302 to propagate via the downlink path 330 and loop back via the uplink path 332 in the DAS 300. In this regard, the test signal 302 is a downlink signal and the loopback signal 302' is an uplink signal.

With continuing reference to FIG. 3, a signal generator 342 is communicatively coupled to the first contact point 338 and configured to provide the test signal 302 for distribution to the RAU 306(1) on the downlink path 330. The signal generator 342 is configured to generate the test signal 302 of known characteristics (e.g., center frequency, bandwidth, etc.). In a non-limiting example, the signal generator 342 is coupled to the first contact point 338 by a first communications link 344, which may be a coaxial cable for example. The test signal 302 propagates from the first contact point 338 to the RAU duplexer 322 in the RAU 306(1). In a non-limiting example, the RAU duplexer 322 does not have sufficient isolation between the downlink path 330 and the uplink path 332. As a result, a portion or a whole of the test signal 302 may leak into the uplink path 332, thus generating the loopback test signal 302' in the uplink path 332.

A receiver 346 is communicatively coupled to the second contact point 340 to receive the loopback test signal 302' from the RAU 306(1) over the uplink path 332. In a non-limiting example, the receiver 346 is coupled to the second contact point 340 by a second communications link 348, which may also be a coaxial cable. In this regard, the test signal 302 that propagates from the first contact point 338 to the RAU duplexer 322 and the loopback test signal 302' that propagates from the RAU duplexer 322 to the second contact point 340 create a signal loop 350 (also known as a signal path). As shown in FIG. 3, the loopback test signal 302' propagates from the RAU duplexer 322 to the HEU 304 via the RAU uplink circuit 326. In a non-limiting example, the RAU uplink circuit 326 includes a power amplifier (not shown) that increases respective power level of the loopback test signal 302'. As a result, the loopback test signal 302' may have a higher power level than the test signal 302. To allow the test signal 302 to propagate from the uplink path 332 back to the downlink path 330 and reach the second contact point 340, the RIM uplink circuit 320 is coupled to the RIM downlink circuit 318 through an HEU duplexer 352. In a non-limiting example, the HEU duplexer 352 is configured to couple the RIM uplink circuit 320 to the RIM downlink circuit 318 via a shunt resistor 354. As a result, the DAS 300 is decoupled from radio sources (e.g., the radio sources 214(1)-214(M) of FIG. 2), thus making the test signal 302, and thus the loopback test signal 302', clean test signals for determining the actual loop gain ($G_{LA}$).

In this regard, the signal loop 350 starts from the first contact point 338 and ends at the second contact point 340. The signal loop 350 includes the downlink splitter 310, the RAU downlink circuit 324, and the RAU duplexer 322 in the downlink path 330. In the uplink path 332, the signal loop 350 includes the RAU uplink circuit 326, the uplink combiner 312, the uplink splitter 314, the RIM uplink circuit 320, and the HEU duplexer 352. The signal loop 350 further includes the RIM downlink circuit 318 and the downlink combiner 308.

The test signal 302 has a first power level ($P_1$) when the signal generator 342 injects the test signal 302 into the DAS 300. As the test signal 302 propagates from the first contact point 338 towards the second contact point 340 along the signal loop 350, components involved in the signal loop 350 (e.g., the RAU duplexer 322, the power amplifier in the RAU uplink circuit 326, etc.) may cause the loopback test signal 302' to gain additional power as a result of insufficient isolation in the components. As such, the loopback test signal 302' will have a second power level ($P_2$) at the second contact point 340. The receiver 346, which may be a signal analyzer for example, can thus determine the actual loop gain ($G_{LA}$) of the DAS 300 based on the equation (Eq. 1) below.

$$G_{LA}=P_2-P_1 \qquad (Eq.\ 1)$$

The actual loop gain ($G_{LA}$) of the DAS 300 is the difference between the second power level ($P_2$) when the loopback test signal 302' is received at the second contact point 340 and the first power level ($P_1$) when the test signal 302 injected to the first contact point 338. When the actual loop gain ($G_{LA}$) is greater than zero (0), it is an indication that the test signal 302 has gained power along the signal loop 350, and one or more of the components involved in the signal loop 350 may be insufficiently isolated.

In a non-limiting example, the receiver 346 determines the first power level ($P_1$) of the test signal 302 by communicating to the signal generator 342. In another non-limiting example, the receiver 346 and the signal generator 342 are integrated and configured to share information via a shared storage media (not shown). In another non-limiting example, the receiver 346 and the signal generator 342 are embedded parts of the DAS 300. The receiver 346 and the signal generator 342 may be used also for other tasks such as spectrum monitoring and system gain adjustment. System gain adjustment may be performed, for example, during system maintenance, change-out of components and at other suitable intervals.

In a non-limiting example, the receiver 346 includes one or more processors 356 and storage media 358. The processors 356 are configured to determine the actual loop gain ($G_{LA}$) of the DAS 300 according to the equation (Eq. 1). The processors 356 are further configured to record the actual loop gain ($G_{LA}$) in the storage media 358. A computing device 360 (e.g., a laptop computer, a desktop computer, a test equipment, etc.) may be communicatively coupled to the receiver 346 to retrieve the actual loop gain ($G_{LA}$) from the storage media 358 and present the actual loop gain ($G_{LA}$) via graphical interfaces such as liquid crystal display (LCD). In a non-limiting example, an operator/engineer receives an indication on the gain margin ($G_M$) through, for example, the computing device 360. If the gain margin ($G_M$) is positive, the DAS 300 may be tuned or modified (for example, more remote antenna units may be added) while monitoring the impact on the gain margin ($G_M$). If the gain margin ($G_M$) is zero (or negative) then corrective actions may be taken by the operator/engineer.

The signal generator 342 and/or the receiver 346 can be configured to determine the actual loop gain ($G_{LA}$) in the DAS 300 based on a process. In this regard, FIG. 4 is a flowchart of an exemplary actual loop gain determination process 400 for determining the actual loop gain ($G_{LA}$) of the DAS 300 of FIG. 3 based on the test signal 302.

Figure 4:
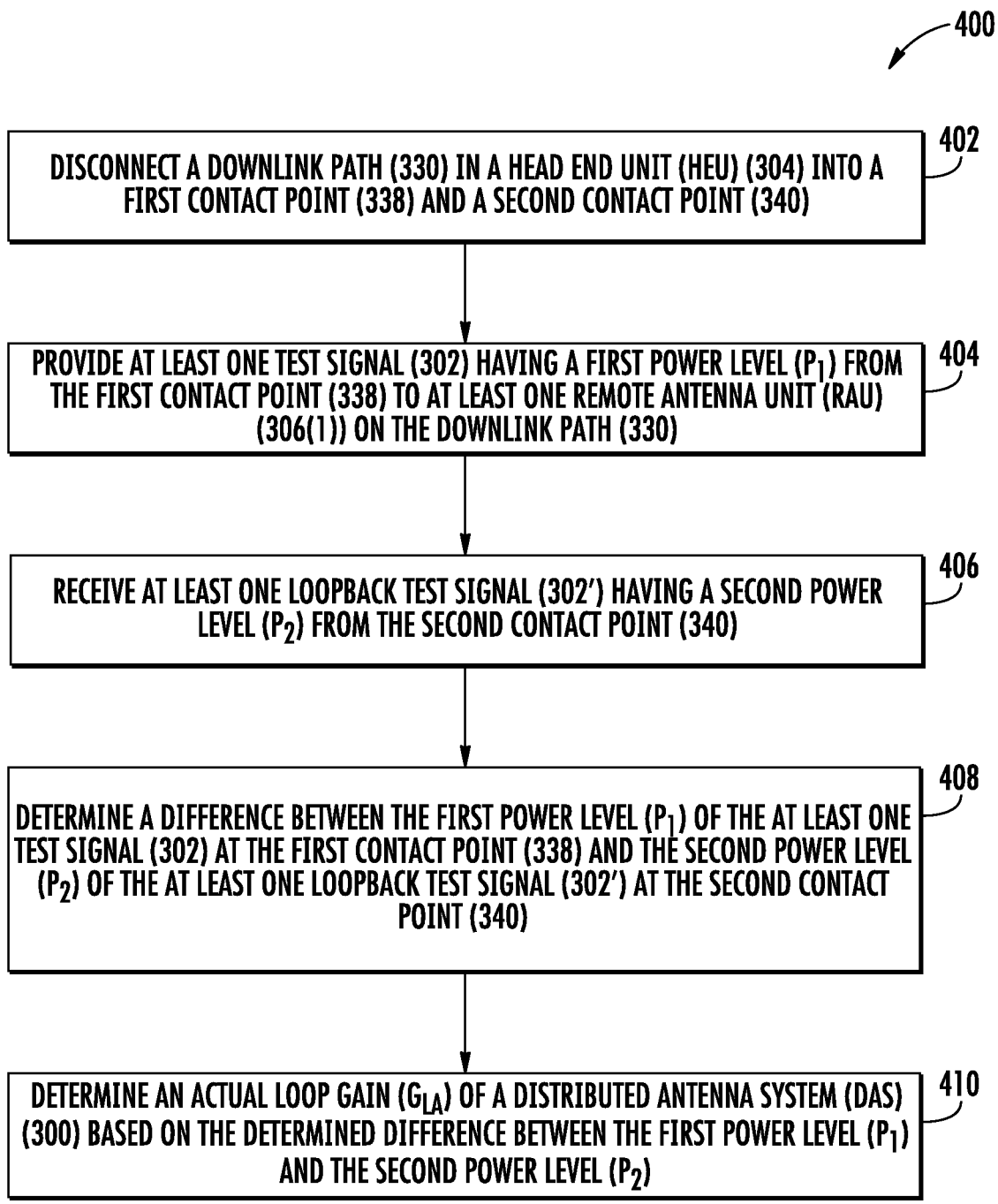
FIG. 4 is a flowchart of an exemplary actual loop gain determination process for determining the actual loop gain ($G_{LA}$) of the DAS in FIG. 3 based on determining the difference in power level of the at least one test signal injected into the DAS at the first contact point in the DAS and received at the second contact point in the DAS

With reference to FIG. 4, the downlink path 330 in the HEU 304 is disconnected into the first contact point 338 and the second contact point 340 (block 402). Next, the signal generator 342 provides the test signal 302, which has the first power level ($P_1$), from the first contact point 338 to the RAU 306(1) on the downlink path 330 (block 404). The receiver 346 receives the loopback test signal 302', which has the second power level ($P_2$), from the second contact point 340 (block 406). The receiver 346 then determines the difference between the first power level ($P_1$) of the test signal 302 at the first contact point 338 and the second power level ($P_2$) of the loopback signal 302' at the second contact point 340 (block 408). The receiver then determines the actual loop gain ($G_{LA}$) of the DAS 300 based on the determined difference between the first power level ($P_1$) and the second power level ($P_2$) (block 410).

With reference back to FIG. 3, after determining the actual loop gain ($G_{LA}$) of the DAS 300, the receiver 346 is able to determine a gain margin ($G_M$) for the DAS 300 based on the equation (Eq. 2) below.

$$G_M=G_{LC}-G_{LA} \qquad (Eq.\ 2)$$

According to equation (Eq. 2), the gain margin ($G_M$) refers to the margin between a critical loop gain ($G_{LC}$) and the actual loop gain ($G_{LA}$). The critical loop gain ($G_{LC}$) is a loop gain measure that, when exceeded, may cause noticeable distortion and/or instability (e.g., oscillation) in the DAS 300. In a non-limiting example, the critical loop gain ($G_{LC}$) is generally set to negative fifteen decibels (−15 dB). It shall be noted that the critical loop gain ($G_{LC}$) may be set differently from one DAS to another. For example, in one DAS, a negative twenty decibels (−20 dB) critical loop gain ($G_{LC}$) may be sufficient to prevent distortion and/or instability, while another DAS may require a negative eight decibels (−8 dB) critical loop gain ($G_{LC}$) to prevent distortion and/or instability. In this regard, if the gain margin (GM) is greater than zero (0) ($G_M>0$), it is an indication that the DAS 300 is not configured to maximum capability and/or capacity. In contrast, if the gain margin ($G_M$) is less than or equal to 0 ($G_M \leq 0$), it is an indication that the DAS 300 is configured over maximum capability and/or capacity, and is thus susceptible to distortions and/or instabilities. The actual loop gain ($G_{LA}$) and the gain margin ($G_M$) are useful indicators that can be used to fine tune the DAS 300 for optimal capacity and performance. As such, the loop gain ($G_{LA}$) and the gain margin ($G_M$) are typically determined after the commissioning process of the DAS 300 and prior to connecting the DAS 300 to radio sources (not shown) to begin commercial services.

With continuing reference to FIG. 3, in a non-limiting example, the DAS 300 is an optical fiber-based DAS. In this regard, the HEU 304 includes an HEU electrical-to-optical (E/O) converter 362 on the downlink path 330 and an HEU optical-to-electrical (O/E) converter 364 on the uplink path 332. Likewise, the RAU 306(1) includes an RAU O/E converter 366 and an RAU E/O converter 368. The HEU E/O converter 362 is configured to convert the test signal 302 into a downlink optical test signal 370. The RAU O/E converter 366 is configured to receive and convert the downlink optical test signal 370 into the test signal 302. The RAU E/O converter 368 is configured to convert the test signal 302 into an uplink optical test signal 372 and provide the uplink optical test signal 372 to the HEU 304. The HEU O/E converter 364 is configured to receive and convert the uplink optical test signal 372 into the test signal 302.

Figure 5:
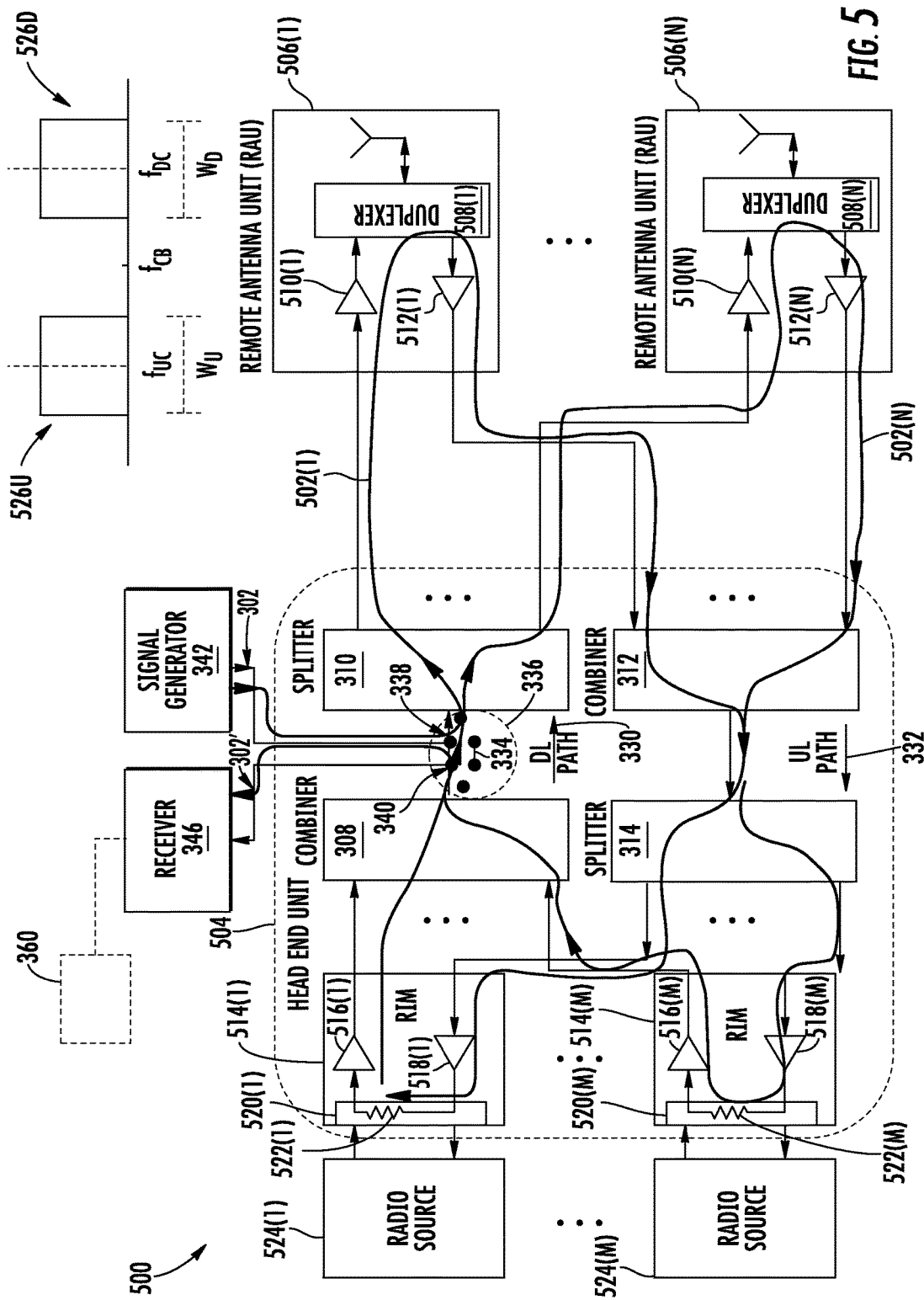
FIG. 5 is a schematic diagram of an exemplary DAS configured to enable measurement of the actual loop gain ($G_{LA}$) of the DAS in FIG. 3 based on the at least one test signal that propagates along a plurality of signal loops.

Aspects of measuring the actual loop gain ($G_{LA}$) and determining the gain margin ($G_M$) as described in reference to FIG. 3 are applicable to a DAS having a plurality RAUs. In this regard, FIG. 5 is a schematic diagram of an exemplary DAS 500 configured to enable measurement of the actual loop gain ($G_{LA}$) of the DAS 300 in FIG. 3 based on the test signal 302 that propagates along a plurality of signal loops 502(1)-502(N). Common elements between FIGS. 3 and 5 are shown therein with common element numbers and will not be re-described herein.

With reference to FIG. 5, the DAS 500 includes an HEU 504 and a plurality of RAUs 506(1)-506(N). The RAUs 506(1)-506(N) are functionally equivalent to the RAU 306(1)-306(N) of FIG. 3. The RAUs 506(1)-506(N) include a plurality of RAU duplexers 508(1)-508(N), a plurality of RAU downlink circuits 510(1)-510(N), and a plurality of RAU uplink circuits 512(1)-512(N), respectively. Each of the RAU duplexers 508(1)-508(N) is functionally equivalent to the RAU duplexer 322 of FIG. 3. Each of the RAU downlink circuits 510(1)-510(N) is functionally equivalent to the RAU downlink circuit 324 of FIG. 3. Each of the RAU uplink circuits 512(1)-512(N) is functionally equivalent to the RAU uplink circuit 326 of FIG. 3.

The HEU 504 includes one or more RIMs 514(1)-514(M). The RIMs 514(1)-514(M) include one or more RIM downlink circuits 516(1)-516(M) and one or more RIM uplink circuits 518(1)-518(M), respectively. The RIM downlink circuits 516(1)-516(M) are coupled to the RIM uplink circuits 518(1)-518(M) via one or more HEU duplexers 520(1)-520(M), respectively. In a non-limiting example, the HEU duplexers 520(1)-520(M) include one or more shunt resistors 522(1)-522(M), respectively. The shunt resistors 522(1)-522(M) are configured to provide proper terminations to the RIM downlink circuits 516(1)-516(M) and the RIM uplink circuits 518(1)-518(M), respectively. As such, the DAS 500 is decoupled from one or more radio sources 524(1)-524(M), thus making the test signal 302 and the loopback test signal 302' clean test signals for determining the actual loop gain ($G_{LA}$).

With continuing reference to FIG. 5, the signal generator 342 injects the test signal 302 into the DAS 500 from the first contact point 338. The test signal 302, which has the first power level ($P_1$), propagates from the first contact point 338 to the second contact point 340 along the signal loops 502(1)-502(N). The receiver 346 is configured to receive the loopback test signal 302' at the second contact point 340 and measure the second power level ($P_2$) of the loopback test signal 302'. The receiver 346 can thus determine the actual loop gain ($G_{LA}$) of the DAS 500 according to Eq. 1 above. Since the test signal 302 propagates along the signal loops 502(1)-502(N), the actual loop gain ($G_{LA}$) of the DAS 500 is a sum of respective loop gains produced by the signal loops 502(1)-502(N). Accordingly, the receiver 346 can determine the gain margin ($G_M$) of the DAS 500 based on Eq. 2 above. According to previous discussions in FIG. 3, if the gain margin ($G_M$) is greater than 0 ($G_M > 0$), it is an indication that the DAS 500 is not configured to maximum capability and/or capacity. In contrast, if the gain margin ($G_M$) is less than or equal to 0 ($G_M \leq 0$), it is an indication that the DAS 500 is configured over maximum capability and/or capacity, and is thus susceptible to distortions and/or instabilities.

With continuing reference to FIG. 5, the DAS 500 may be configured to support a plurality of wireless communications services in a variety of frequency bands. For example, the DAS 500 is configured to provide LTE services and/or WCDMA services. Accordingly, the DAS 500 is configured to operate in LTE frequency bands, personal communications service (PCS) frequency band, and/or advanced wireless service (AWS) frequency bands. In a non-limiting example, the DAS 500 is configured to operate in a frequency-division duplexing (FDD) mode that requires at least one downlink frequency band and at least one uplink frequency band to function. For example, the PCS frequency band includes an uplink frequency band, which ranges from one thousand eight hundred fifty megahertz (1850 MHz) to one thousand nine hundred fifteen megahertz (1915 MHz), and a downlink frequency band, which ranges from one thousand nine hundred thirty megahertz (1930 MHz) to one thousand nine hundred ninety-five megahertz (1995 MHz). In this regard, it is necessary to determine the actual loop gain ($G_{LA}$) based on the frequency band(s) in which the DAS 500 is designed to operate.

As such, the signal generator 342 may be configured to generate the test signal 302 that corresponds to at least one downlink frequency band 526D (e.g., the 1930-1995 MHz PCS downlink band) and at least one uplink frequency band 526U (e.g., the 1850-1915 MHz PCS uplink band). The downlink frequency band 526D corresponds to a downlink center frequency ($f_{DC}$) and a downlink frequency bandwidth ($W_D$). The uplink frequency band 526U corresponds to an uplink center frequency ($f_{UC}$) and an uplink frequency bandwidth ($W_U$). A cross band frequency ($f_{CB}$) is the middle point frequency between the downlink center frequency ($f_{DC}$) and the uplink center frequency ($f_{UC}$) ($f_{CB}=(f_{DC}+f_{UC})/2$).

Continuing with the PCS frequency band example, the downlink center frequency ($f_{DC}$) and the uplink center frequency ($f_{UC}$) are one thousand nine hundred sixty-two point five megahertz (1962.5 MHz) and one thousand eight hundred eighty-two point five megahertz (1882.5 MHz), respectively. Accordingly, the cross band frequency (fCB) is one thousand nine hundred twenty-two point five megahertz (1922.5 MHz). In this regard, to determine the actual loop gain ($G_{LA}$) for the PCS frequency band, the signal generator 342 needs to generate the test signal 302 that corresponds to the downlink frequency band (1930-1995 MHz) and the uplink frequency band (1850-1915 MHz) of the PCS frequency band.

As previously mentioned, the DAS 500 may be configured to operate in additional frequency bands, such as the LTE frequency band and the AWS frequency band, for example. In this regard, it may be possible that the RAU 506(1) is configured to operate on the PCS frequency band, the RAU 506(2) is configured to operate on the LTE frequency band, and the RAU 506(N) is configured to operate on the AWS frequency band. In a non-limiting example, these additional frequency bands may have respective cross band frequency ($f_{CB}$) located throughout the frequency spectrum of the DAS 500. To determine the actual loop gain ($G_{LA}$) in the context of all the downlink and uplink frequency bands which the RAUs 506(1)-506(N) are configured to support, the test signal 302 propagating along the signal loops 502(1)-502(N) needs to cover the entire frequency spectrum of the DAS 500. In this regard, in a non-limiting example, if the DAS 500 is configured to support a frequency spectrum ranging from four hundred fifty megahertz (450 MHz) to two thousand seven hundred megahertz (2700 MHz), the signal generator 342 needs to generate the test signal 302 by sweeping the frequency spectrum of the DAS 500. In this regard, the test signal 302 is a narrow band signal corresponding to a respective cross band frequency ($f_{CB}$).

With continuing reference to FIG. 5, the receiver 346 receives the test signal 302 having the second power level ($P_2$). As such, when the signal generator 342 sweeps the frequency spectrum of the DAS 500, the receiver 346 is able to determine the second power level ($P_2$) of the test signal 302 at both cross band frequencies ($f_{CB}$) and non-cross band frequencies. For purpose of distinction, the second power level ($P_2$) corresponding to the cross band frequencies ($f_{CB}$) is hereinafter referred to as a cross band power level.

Figure 6:
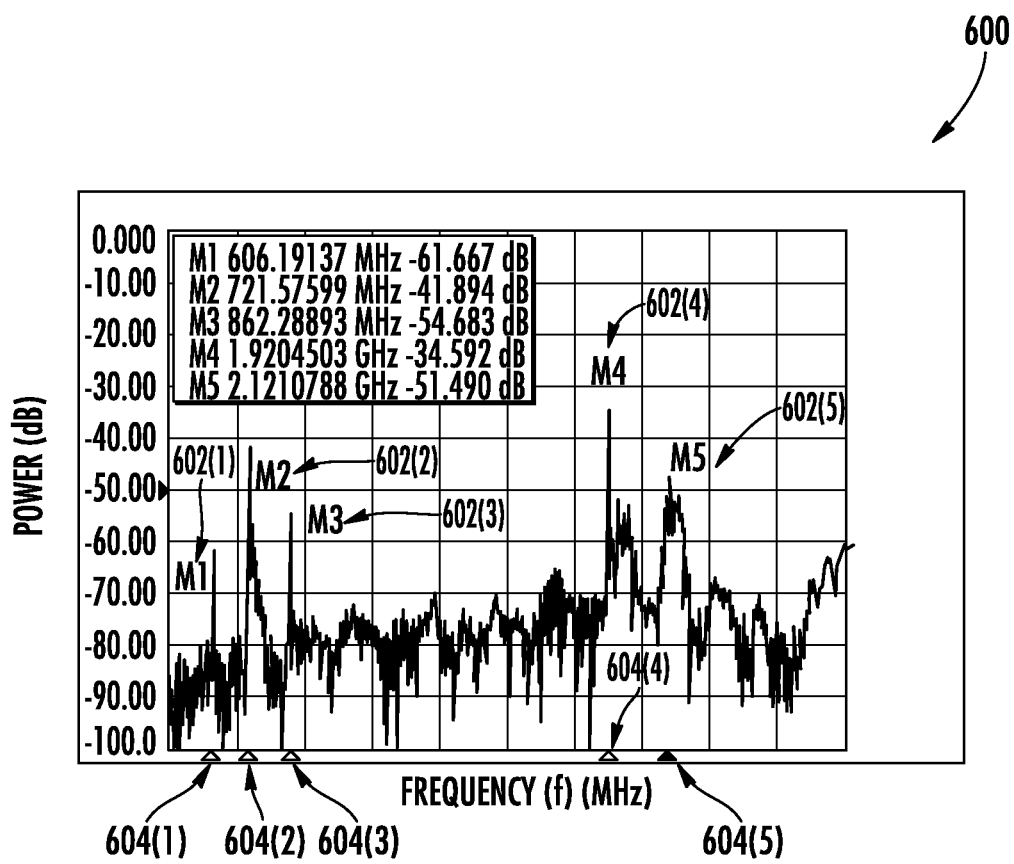
FIG. 6 is a graph providing an exemplary illustration of a plurality of power level markers at a plurality of frequencies that is part of an exemplary frequency spectrum of the DAS of FIG. 5.

In a non-limiting example, the cross band power level can be graphed and visualized on the computing device 360. In this regard, FIG. 6 is a graph 600 providing an exemplary illustration of a plurality of power level markers 602(1)-602 (5) (also known as markers) at a plurality of frequencies 604(1)-604(5) that is part of the frequency spectrum of the DAS 500 of FIG. 5. Common elements of FIG. 5 are referenced in connection with FIG. 6 and will not be re-described herein.

With reference to FIG. 6, the graph 600 illustrates power level of the test signal 302 (Y-axis) as a function of frequency ($f$) of the test signal 302 (X-axis). In FIG. 6, the range for the power level is between negative one hundred decibels (−100 dB) and zero decibels (0 dB), while the range of the frequency ($f$) is between four hundred fifty megahertz (450 MHz) and two thousand seven hundred megahertz (2700 MHz or 2.7 GHz). As illustrated in FIG. 6, the power level markers 602(1)-602(5) indicate that the test signal 302 peaks at the frequencies 604(1)-604(5). In a non-limiting example, the frequencies 604(1)-604(5) correspond to approximately six hundred six megahertz (606 MHz), seven hundred twenty-one megahertz (721 MHz), eight hundred sixty-two megahertz (862 MHz), one thousand nine hundred twenty megahertz (1920 MHz), and two thousand one hundred twenty-one megahertz (2121 MHz), respectively. Among the frequencies 604(1)-604(5), the frequencies 604 (1)-604(4) are cross band frequencies ($f_{CB}$), but the frequency 604(5) is not a cross band frequency ($f_{CB}$).

Accordingly, the power level markers 602(1)-602(4) corresponding to the cross band frequencies ($f_{CB}$) 604(1)-604 (4) are cross band power level markers. Among them, the cross band power level marker 602(2) corresponds to the 721 MHz LTE cross band frequency ($f_{CB}$). The cross band power level marker 602(1) corresponds to the 606 MHz cross band frequency ($f_{CB}$), which is the same as a seven hundred twenty-one megahertz (721 MHz) LTE cross band frequency ($f_{CB}$), but multiplexed and synthesized to transmit with the 721 MHz LTE cross band frequency ($f_{CB}$) over an optical fiber. The cross band power level marker 602(3) corresponds to the 862 MHz cross band frequency ($f_{CB}$). The cross band power level marker 602(4) corresponds to a one thousand nine hundred twenty-two point five megahertz (1922.5 MHz) PCS cross band frequency ($f_{CB}$). The power level marker 602(5), however, does not correspond to a cross band frequency ($f_{CB}$) and may result from noise in the DAS 500.

As illustrated in the graph 600, the cross band power level at the cross band frequency ($f_{CB}$) 604(1) is negative sixty-one decibels (−61 dB). Accordingly, a margin of gain (MG) at the cross band frequency ($f_{CB}$) 604(1) can be determined based on the equation (Eq. 3) below.

$$M_G = \text{(Cross Band Power Level)} - \text{(Predetermined Threshold)} \quad \text{(Eq. 3)}$$

In a non-limiting example, the predetermined threshold is the same as the critical loop gain ($G_{LS}$) as previously discussed. As such, if the predetermined threshold is −20 dB, then the margin of gain ($M_G$) at the cross band frequency ($f_{CB}$) 604(1) is negative forty-one decibels (−41 dB) according to equation (Eq. 3).

In another non-limiting example, the cross band power level at the cross band frequency ($f_{CB}$) 604(2) is negative forty-two decibels (−42 dB). As such, if the predetermined threshold is −20 dB, then the margin of gain ($M_G$) at the cross band frequency ($f_{CB}$) 604(2) is negative twenty-two decibels (−22 dB) according to equation (Eq. 3).

In another non-limiting example, the cross band power level at the cross band frequency ($f_{CB}$) 604(3) is negative fifty-four decibels (−54 dB). As such, if the predetermined threshold is −20 dB, then the margin of gain ($M_G$) at the cross band frequency ($f_{CB}$) 604(3) is negative thirty-four decibels (−34 dB) according to equation (Eq. 3).

In another non-limiting example, the cross band power level at the cross band frequency ($f_{CB}$) 604(4) is −34 dB. As such, if the predetermined threshold is −20 dB, the margin of gain ($M_G$) at the cross band frequency ($f_{CB}$) 604(4) is negative fourteen decibels (−14 dB) according to equation (Eq. 3).

With continuing reference to FIG. 6, the margin of gain ($M_G$) determined based on the power level markers 602(1)-602(4) may be used to optimize the DAS 500 at the cross band frequencies ($f_{CB}$) 604(1)-604(4). In a first non-limiting example, it is possible to reduce power level of the radio sources 524(1)-524(M) in FIG. 5 based on the margin of gain ($M_G$) corresponding to the cross band frequencies 604(1)-604(4). In a second non-limiting example, it is possible to include additional components when the margin of gain ($M_G$) corresponding to the cross band frequencies ($f_{CB}$) 604(1)-604(4) indicates that the additional components are allowable. The additional components may include additional RAUs and/or RIMs. In a third non-limiting example, it is possible to modify gain range of the RAUs 506(1)-506 (N) in FIG. 5 based on the margin of gain ($M_G$) corresponding to the cross band frequencies ($f_{CB}$) 604(1)-604(4).

With reference back to FIG. 5, the computing device 360 may display the graph 600 of FIG. 6 through graphical user interfaces (GUIs). In addition, the computing device 360 may provide interactive GUI for an operator/engineer to configure and/or control the signal generator 342 and the receiver 346 to measure the actual loop gain ($G_{LA}$) and determine the margin of gain ($M_G$) in the DAS 500. In this regard, FIG. 7 is an exemplary interactive GUI 700 that the computing device 360 of FIGS. 3 and 5 may employ to interact with an operator/engineer for measuring the actual loop gain ($G_{LA}$) in the DAS 300 of FIG. 3 and the DAS 500 of FIG. 5.

Figure 7:
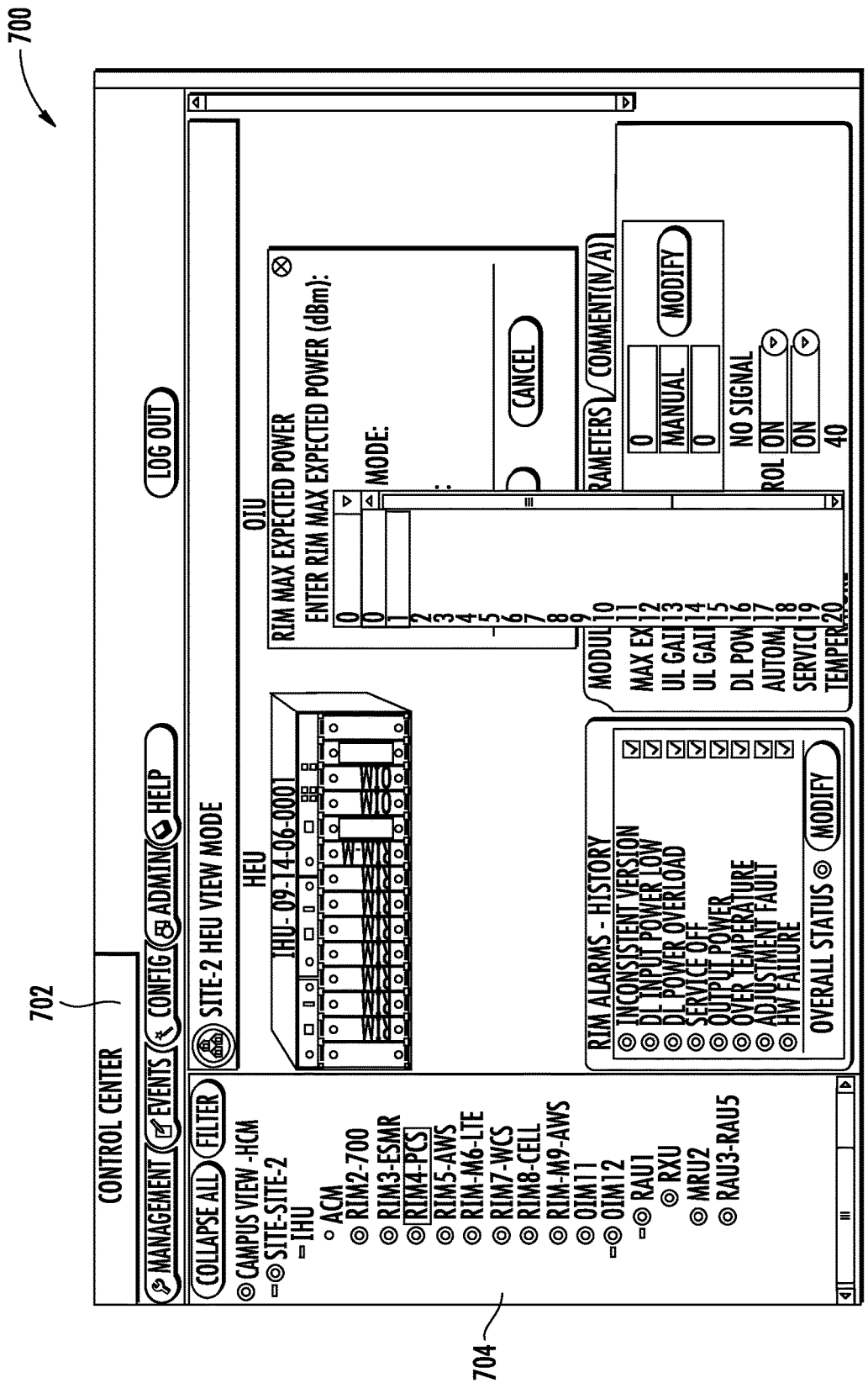
FIG. 7 is an exemplary interactive graphical user interface (GUI) that a computing device may employ to interact with an operator/engineer for measuring the actual loop gain ($G_{LA}$) in the DASs of FIGS. 3 and 5.

With reference to FIG. 7, the interactive GUI 700 includes a user control center 702 for adjusting the actual loop gain ($G_{LA}$) in the DAS 300 and the DAS 500. The user control center 702 includes a selection panel 704 and a settings input panel 706. The selection panel 704 allows users to select a particular communications channel (e.g., band of frequencies) for actual loop gain ($G_{LA}$) adjustment. The settings input panel 706 allows users to adjust a gain setting that is applicable to a frequency band in the frequency spectrum of the DAS 300 and the DAS 500.

Figure 8:
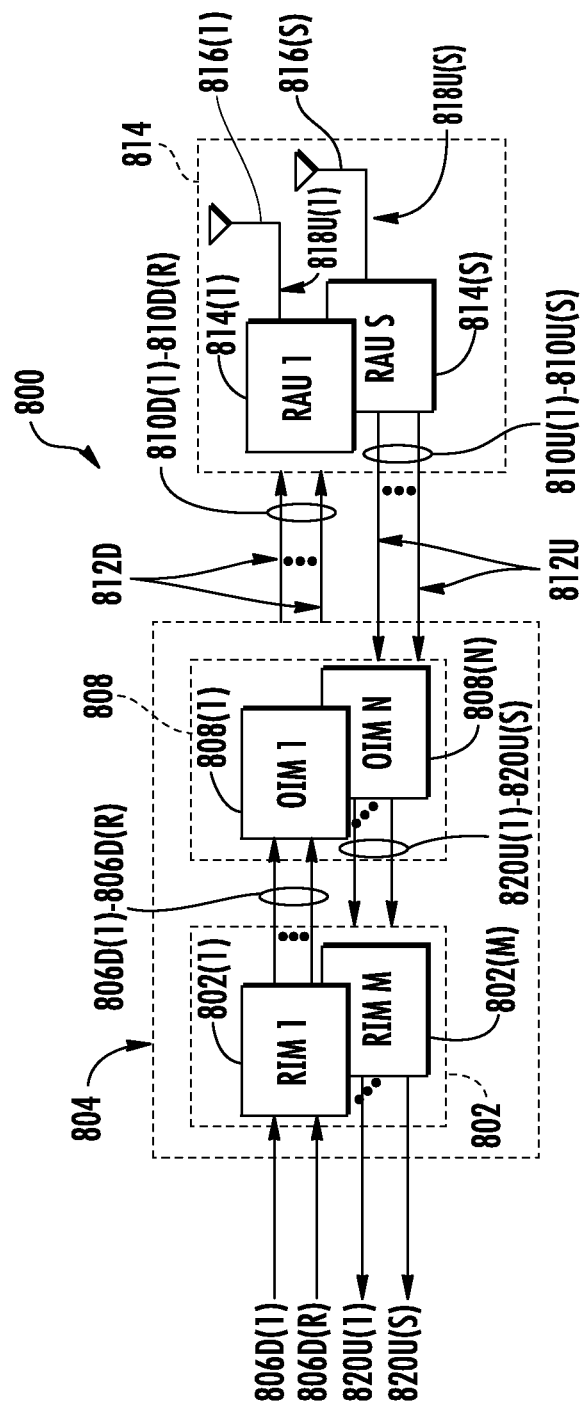
FIG. 8 is a schematic diagram of an exemplary DAS that can be configured to function as the DASs of FIGS. 3 and 5.

FIG. 8 is a schematic diagram of an exemplary DAS 800 that can be configured to function as the DAS 300 of FIG. 3 and the DAS 500 of FIG. 5. In this example, the DAS 800 is an optical fiber-based DAS 800. The DAS 800 includes an optical fiber for distributing communications services for multiple frequency bands. The DAS 800 in this example is comprised of three (3) main components. One or more radio interfaces provided in the form of radio interface modules (RIMs) 802(1)-802(M) are provided in a central unit 804 to receive and process downlink electrical communications signals 806D(1)-806D(R) prior to optical conversion into downlink optical fiber-based communications signals. The downlink electrical communications signals 806D(1)-806D(R) may be received from a base station (not shown) as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve (12) RIMs 802(1)-802(12). Each RIM 802(1)-802(M) can be designed to support a particular type of radio source or range of radio sources (i.e., frequencies) to provide flexibility in configuring the central unit 804 and the DAS 800 to support the desired radio sources.

For example, one RIM 802 may be configured to support the PCS radio band. Another RIM 802 may be configured to support the 800 MHz radio band. In this example, by inclusion of these RIMs 802, the central unit 804 could be configured to support and distribute communications signals on both PCS and LTE 700 radio bands, as an example. The RIMs 802 may be provided in the central unit 804 that support any frequency bands desired, including but not limited to the US Cellular band, PCS band, AWS band, 700 MHz band, Global System for Mobile communications (GSM) 900, GSM 1800, and Universal Mobile Telecommunications System (UMTS). The RIMs 802(1)-802(M) may also be provided in the central unit 804 that support any wireless technologies desired, including but not limited to Code Division Multiple Access (CDMA), CDMA200, 1xRTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink electrical communications signals 806D(1)-806D(R) are provided to a plurality of optical interfaces provided in the form of optical interface modules (OIMs) 808(1)-808(N) in this embodiment to convert the downlink electrical communications signals 806D(1)-806D(R) into downlink optical fiber-based communications signals 810D(1)-810D(R). The notation "1-N" indicates that any number of the referenced component 1-N may be provided. The OIMs 808 may be configured to provide one or more optical interface components (OICs) that contain optical to electrical (O/E) and electrical to optical (E/O) converters, as will be described in more detail below. The OIMs 808 support the radio bands that can be provided by the RIMs 802, including the examples previously described above.

The OIMs 808(1)-808(N) each include E/O converters to convert the downlink electrical communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of RAUs 814(1)-814(S). The notation "1-S" indicates that any number of the referenced component 1-S may be provided. O/E converters provided in the RAUs 814(1)-814(S) convert the downlink optical fiber-based communications signals 810D(1)-810D(R) back into the downlink electrical communications signals 806D(1)-806D(R), which are provided to antennas 816(1)-816(S) in the RAUs 814(1)-814(S) to client devices (not shown) in the reception range of the antennas 816(1)-816(S).

E/O converters are also provided in the RAUs 814(1)-814(S) to convert uplink electrical communications signals 818U(1)-818U(S) received from client devices through the antennas 816(1)-816(S) into uplink optical fiber-based communications signals 810U(1)-810U(S). The RAUs 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include 0/E converters that convert the received uplink optical fiber-based communications signals 810U(1)-810U(S) into uplink electrical communications signals 820U(1)-820U(S), which are processed by the RIMs 802(1)-802(M) and provided as uplink electrical communications signals 820U(1)-820U(S). The central unit 804 may provide the uplink electrical communications signals 820U(1)-820U(S) to a base station or other communications system.

Note that the downlink optical fiber-based communications medium 812D and the uplink optical fiber-based communications medium 812U connected to each RAU 814(1)-814(S) may be a common optical fiber-based communications medium, wherein for example, wave division multiplexing (WDM) may be employed to provide the downlink optical fiber-based communications signals 810D(1)-810D(R) and the uplink optical fiber-based communications signals 810U(1)-810U(S) on the same optical fiber-based communications medium.

Figure 9:
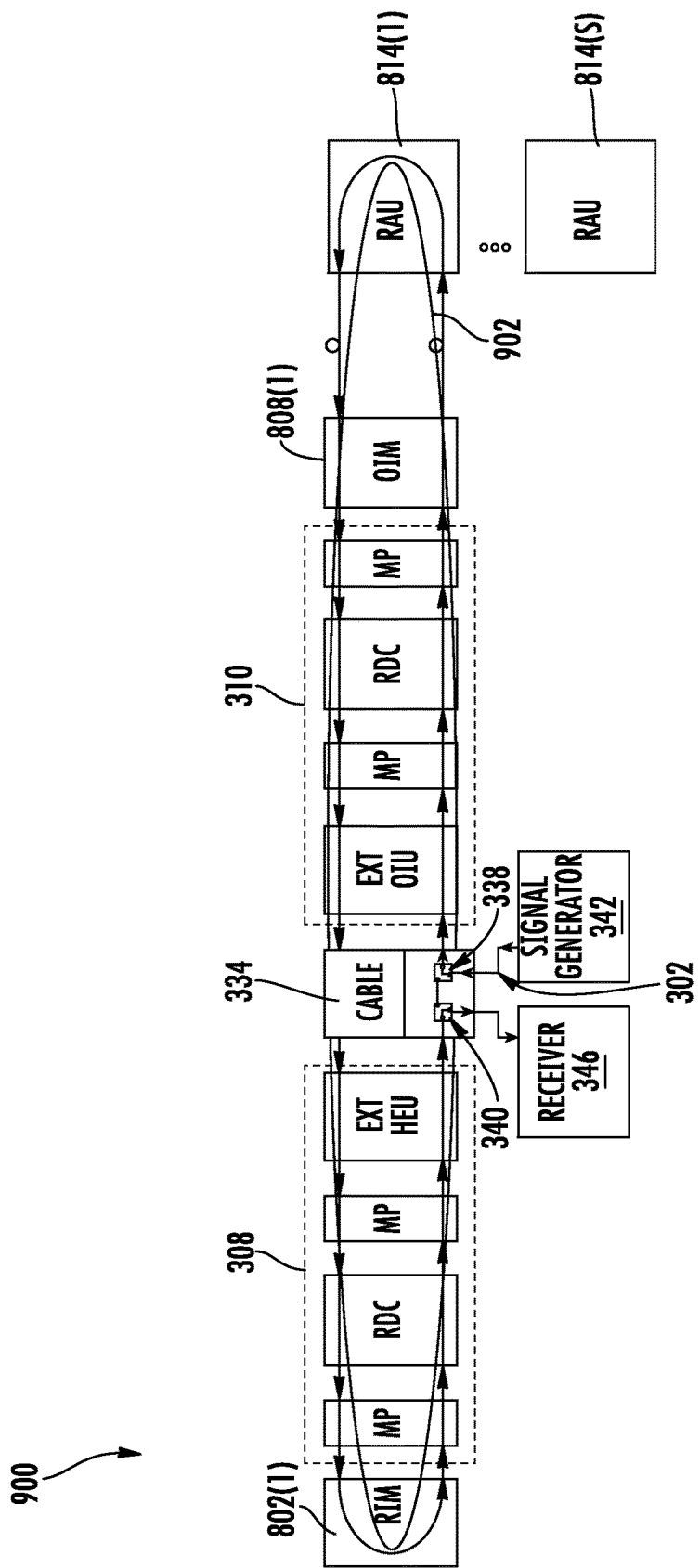
FIG. 9 is a schematic diagram of an exemplary optical fiber-based DAS configured to enable measurement of an actual loop gain ($G_{LA}$) based on determining the difference in power level of at least one test signal injected into the DAS at the first contact point in the DAS and received at the second contact point in the DAS.

With continuing reference to FIG. 8, it is possible to measure the actual loop gain ($G_{LA}$) in the optical fiber-based DAS 800 according to the configurations and operations described in references of FIGS. 3 and 5. In this regard, FIG. 9 is a schematic diagram of an exemplary optical fiber-based DAS 900 configured to enable measurement of the actual loop gain ($G_{LA}$). Common elements between FIGS. 3, 5, 8, and 9 are shown therein with common element numbers and will not be re-described herein.

With reference to FIG. 9, in the optical fiber-based DAS 900, the RIM 802(1) communicates with more than one RAU among the RAUs 814(1)-814(S). It shall be appreciated that, although only one signal loop 902 is shown between the RIM 802(1) and the RAU 814(1), more than one signal loop may exist involving the RIM 802(1). The signal generator 342 is capable of generating the test signal 302 in narrow band and/or broadband frequencies. When a narrow band frequency is generated, the narrow band frequency may correlate to a particular communications protocol (e.g., LTE, WCDMA, etc.). Accordingly, the receiver 346 is configured to determine the actual loop gain ($G_{LA}$) and analyze spectral data (e.g., as a spectrum analyzer) based on the narrow band and/or broadband frequencies.

Figure 10:
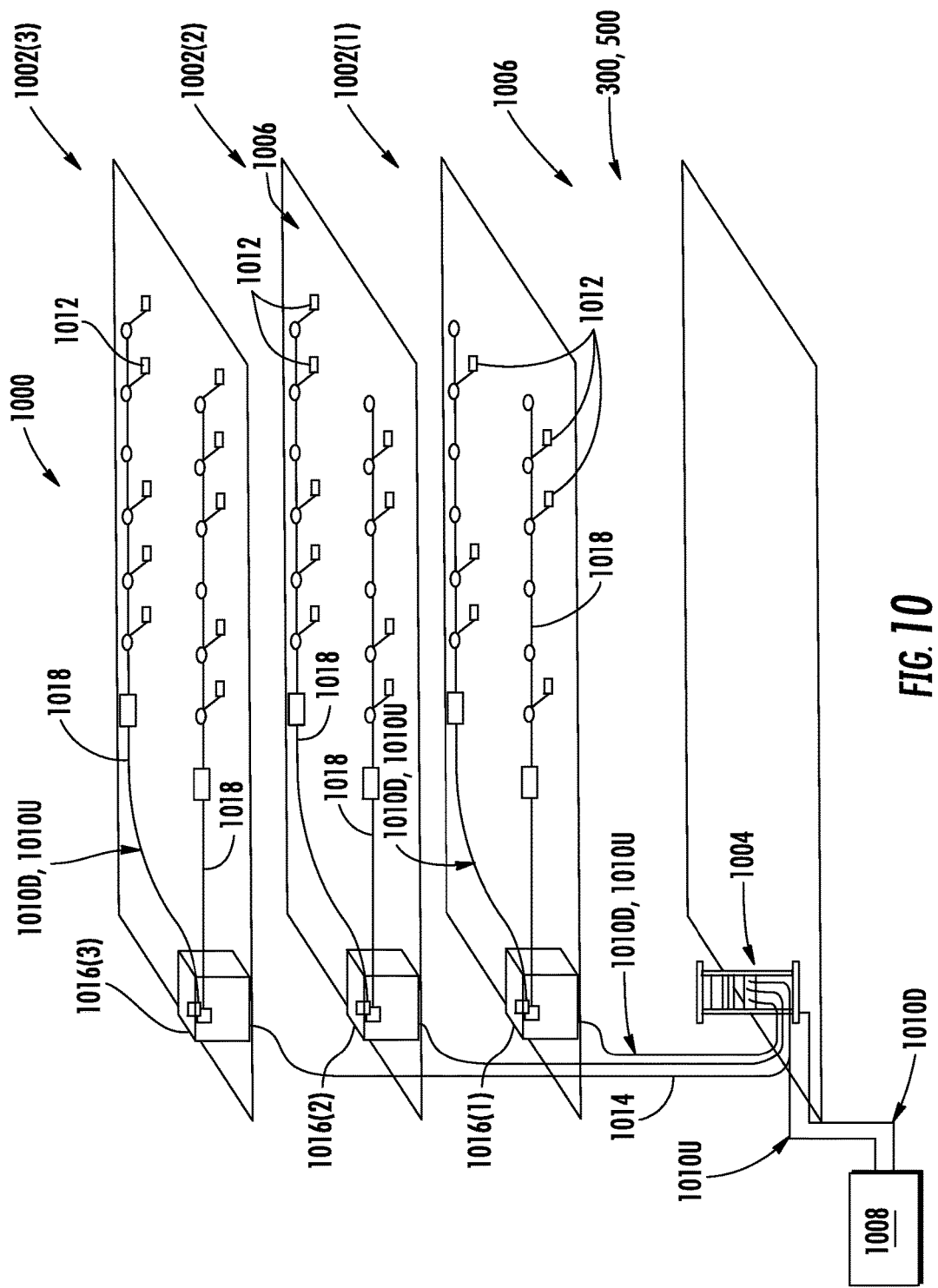
FIG. 10 is a partial schematic cut-away diagram of an exemplary building infrastructure in which DASs configured to enable measurement of the actual loop gain ($G_{LA}$), including the DASs of FIGS. 3 and 5, can be provided.

The DAS 300 of FIG. 3 and the DAS 500 of FIG. 5, which are configured to enable measurement of the actual loop gain ($G_{LA}$), may be provided in an indoor environment, as illustrated in FIG. 10. FIG. 10 is a partial schematic cut-away diagram of an exemplary building infrastructure 1000 in which DASs configured to measure the actual loop gain ($G_{LA}$), including the DAS 300 of FIG. 3 and the DAS 500 of FIG. 5, can be employed. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of remote units 1012 to distribute the downlink communications signals 1010D to the remote units 1012 and to receive uplink communications signals 1010U from the remote units 1012, as previously discussed above. The downlink communications signals 1010D and the uplink communications signals 1010U communicated between the central unit 1004 and the remote units 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed antenna system (DAS) configured to enable actual loop gain measurement, comprising:
   a plurality of remote antenna units (RAUs);
   a head end unit (HEU) configured to:
      distribute a downlink signal to at least one RAU among the plurality of RAUs; and
      receive an uplink signal from the at least one RAU;
   a switch circuit disposed in a downlink path in the HEU and configured to disconnect the downlink path into a first contact point and a second contact point;
   a signal generator communicatively coupled to the first contact point and configured to provide at least one test signal having a first power level to the first contact point for distribution to the at least one RAU on the downlink path; and
   a receiver communicatively coupled to the second contact point and configured to:
      receive at least one loopback test signal having a second power level from the second contact point;
      determine a difference between the first power level of the at least one test signal at the first contact point and the second power level of the at least one loopback test signal at the second contact point; and
      determine an actual loop gain of the DAS based on the determined difference between the first power level and the second power level.

2. The DAS of claim 1, wherein the receiver is further configured to record the actual loop gain of the DAS in storage media.

3. The DAS of claim 1, wherein the at least one test signal corresponds to a frequency spectrum that includes at least one downlink frequency band and at least one uplink frequency band.

4. The DAS of claim 1, wherein the HEU comprises a downlink splitter disposed in the downlink path and coupled to the first contact point by the switch circuit, the downlink splitter is configured to receive the at least one test signal from the signal generator and provide the at least one test signal to the at least one RAU over the downlink path.

5. The DAS of claim 4, wherein the at least one RAU comprises an RAU duplexer configured to receive the at least one test signal on the downlink path and provides the at least one loopback test signal containing a portion of the at least one test signal, that is leaked from the downlink path to an uplink path, to the HEU over the uplink path.

6. The DAS of claim 5, wherein the HEU further comprises:
   an uplink combiner disposed in the uplink path and configured to receive the at least one loopback test signal;
   an uplink splitter disposed in the uplink path and configured to receive the at least one loopback test signal from the uplink combiner; and at least one radio interface module (RIM) comprising an RIM downlink circuit and an RIM uplink circuit, wherein the RIM uplink circuit is configured to receive the at least one loopback test signal from the uplink splitter.

7. The DAS of claim 6, wherein the HEU further comprises an HEU duplexer coupled to the RIM downlink circuit and the RIM uplink circuit.

8. The DAS of claim 7, wherein the HEU duplexer comprises a shunt resistor coupled between the RIM downlink circuit and the RIM uplink circuit, the shunt resistor is configured to bridge the RIM downlink circuit and the RIM uplink circuit.

9. The DAS of claim 7, wherein the HEU further comprises a downlink combiner disposed in the downlink path and coupled to the second contact point, the downlink combiner configured to receive the at least one loopback test signal from the RIM downlink circuit and provide the at least one loopback test signal to the second contact point.

10. The DAS of claim 1, wherein the switch circuit is a broadband switch circuit with isolation.

11. The DAS of claim 1, wherein the HEU comprises a first communications link disposed between the first contact point of the switch circuit and the signal generator and a second communications link disposed between the second contact point of the switch circuit and the receiver.

12. The DAS of claim 1, wherein the at least one RAU comprises a multiple input, multiple output (MIMO) antenna.

13. The DAS of claim 1, wherein the receiver comprises:
one or more processors configured to determine the actual loop gain of the DAS based on the first power level and the second power level of the at least one test signal; and
storage media configured to record the actual loop gain of the DAS.

14. The DAS of claim 13, further comprising a computing device with a graphical user interface, the computing device communicatively coupled to the receiver and configured to adjust the DAS based upon the actual loop gain of the DAS.

15. The DAS of claim 1, wherein the receiver is a spectrum analyzer.

16. The DAS of claim 1, wherein:
the HEU comprises at least one HEU electrical-to-optical (E/O) converter provided on the downlink path and configured to convert the at least one test signal into a downlink optical test signal and provide the downlink optical test signal to the at least one RAU;
the at least one RAU comprises:
an RAU optical-to-electrical (O/E) converter configured to receive and convert the downlink optical test signal into the at least one test signal; and
an RAU E/O converter configured to convert the at least one test signal into an uplink optical test signal and provide the uplink optical test signal to the HEU; and
the HEU further comprises at least one HEU O/E converter configured to receive and convert the uplink optical test signal into the at least one test signal.

17. A method for measuring actual loop gain in a distributed antenna system (DAS), comprising:
disconnecting a downlink path in a head end unit (HEU) into a first contact point and a second contact point;
providing at least one test signal having a first power level from the first contact point to at least one remote antenna unit (RAU) on the downlink path;
receiving at least one loopback test signal having a second power level from the second contact point;
determining a difference between the first power level of the at least one test signal at the first contact point and the second power level of the at least one loopback test signal at the second contact point; and
determining an actual loop gain of the DAS based on the determined difference between the first power level and the second power level.

18. The method of claim 17, further comprising recording the actual loop gain of the DAS in storage media.

19. The method of claim 17, further comprising:
disconnecting the HEU from a radio source;
providing the at least one test signal corresponding to a frequency spectrum that includes at least one downlink frequency band having a downlink center frequency and at least one uplink frequency band having an uplink center frequency;
receiving the at least one loopback test signal in the at least one downlink frequency band and the at least one uplink frequency band, respectively;
identifying a cross band frequency located in the middle of the downlink center frequency and the uplink center frequency;
determining a cross band power level at the cross band frequency based on the second power level of the at least one loopback test signal;
determining a margin of gain between the cross band power level and a predetermined threshold; and
adjusting the DAS based on the margin of gain.

20. The method of claim 19, further comprising modifying a gain range of the at least one RAU based on the margin of gain corresponding to the cross band frequency.

21. The method of claim 19, further comprising reconnecting the HEU to the radio source.

22. The method of claim 21, further comprising reducing power level of the radio source based on the margin of gain corresponding to the cross band frequency.

23. The method of claim 19, further comprising including additional components in the DAS when the margin of gain corresponding to the cross band frequency indicating that the additional components are allowable.

24. The method of claim 19, further comprising including additional radio interface modules (RIMs) in the DAS when the margin of gain corresponding to the cross band frequency indicating that the additional RIMs are allowable.

25. The method of claim 19, further comprising including additional remote antenna units (RAUs) in the DAS when the margin of gain corresponding to the cross band frequency indicating that the additional RAUs are allowable.

26. The method of claim 19, further comprising providing the at least one test signal that corresponds to the at least one downlink frequency band and the at least one uplink frequency band located in a long-term evolution (LTE) frequency band.

27. The method of claim 19, further comprising providing the at least one test signal that corresponds to the at least one downlink frequency band and the at least one uplink frequency band located in a personal communications service (PCS) frequency band.

28. The method of claim 19, further comprising providing the at least one test signal that corresponds to the at least one downlink frequency band and the at least one uplink frequency band located in an advanced wireless service (AWS) frequency band.

29. The method of claim 19, further comprising providing the at least one test signal in the at least one downlink frequency band and the at least one uplink frequency band located in a frequency band selected from the group consisting of: a six hundred six megahertz (606 MHz) band; a seven hundred twenty-one megahertz (721 MHz) band; an eight hundred sixty-two megahertz (862 MHz) band; and a one thousand nine hundred twenty megahertz 1920 MHz) band.

* * * * *